Nov. 5, 1929.                T. F. BARTON                1,734,890
                        SYSTEM OF DISTRIBUTION
                          Filed Aug. 10, 1926
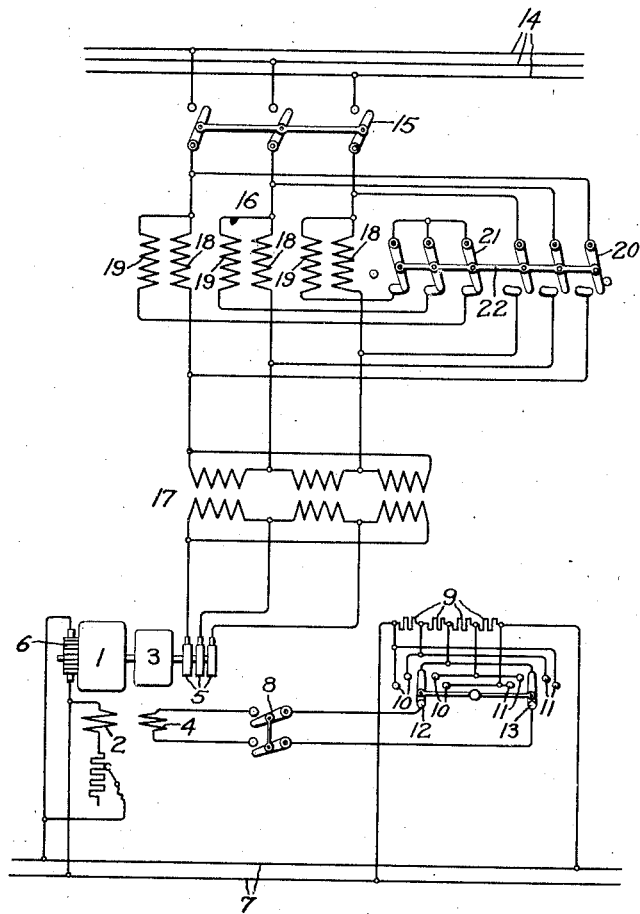
Inventor:
Theophilus F. Barton,
by
His Attorney.

Patented Nov. 5, 1929

1,734,890

UNITED STATES PATENT OFFICE

THEOPHILUS F. BARTON, OF SCHENECTADY, NEW YORK, ASSIGNOR TO GENERAL ELECTRIC COMPANY, A CORPORATION OF NEW YORK

SYSTEM OF DISTRIBUTION

Application filed August 10, 1926. Serial No. 128,488.

My invention relates to systems of distribution, and more particularly to systems of distribution comprising an alternating current supply circuit and a direct current distribution circuit interconnected by converting means, such as rotary transformers, synchronous converters, and the like, for changing electrical energy from one form into another.

In such systems, it is often desirable to change the voltage applied to the converting means from that of the supply circuit in order to initiate properly the operation of the converting means, and it is also often desirable to vary the applied voltage to the converting means when it is operating under various load conditions. For example, a synchronous converter may be started by induction motor action without causing material fluctuations of current in the supply system, if alternating current at reduced voltage is supplied to its collector rings. A means for reducing the supply voltage to the converter is also desirable at times in order to reduce the direct current voltage and thereby the load carried by a particular converter operated in parallel with other converters of a system. Regulating transformers provided with a large number of taps and dial switches for selecting the various taps desired have been interposed between the supply circuit and converter in order to obtain the desired variations in voltage. These transformers and switching devices are large and expensive, particularly where a voltage change in small increments is desired. Furthermore, the electrical circuit to the converter must be interrupted at each change and the switches are subject to rapid deterioration due to sparking while changing the voltage. Induction regulators used in the same manner as tap transformers have eliminated the difficulties accompanying the interruption of the electric circuit and afford a desirable means of varying the voltage to the converter. The induction regulator, however, is costly, requires complicated wiring and considerable floor space, and is difficult to design to withstand the mechanical stresses incident to heavy overloads or short circuits.

It is an object of my invention to provide a new and improved arrangement of apparatus which is simple, reliable and inexpensive and a novel method of operation thereof whereby the alternating voltage applied to converting means interconnecting an alternating current circuit and a direct current circuit may be varied over substantial limits in small increments without interrupting the electrical circuit to the converter. To this end, I provide in series with a synchronous booster converter, or a synchronous converter, having an alternating current machine provided with a variable and reversible field and operated in electrical phase synchronism and connected in series therewith, a regulating transformer having a secondary voltage which is arranged to buck the primary supply voltage. The secondary windings of this transformer are connected in series relation with the circuit to the collecting rings of the converter and are provided with shortcircuiting switches. The primary windings are excited from the supply circuit through switches which are arranged to be closed when the shortcircuiting switches are open in order to effect energization of the regulating transformer. To effect deenergization of the transformer, the switches for the primary winding are opened as the shortcircuiting switches are closed. This transformer provides low voltage for starting and, with the sequence of switching and manipulation of the booster excitation, explained hereinafter affords also a means to limit the load on the converter when the overload conditions occur.

My invention will be better understood from the following description taken in connection with the accompanying drawing, and its scope will be pointed out in the appended claims.

In the drawing, which is a diagrammatic view of one embodiment of my invention, I have shown a synchronous converter 1 having a shunt field winding 2. The converter 1 is mechanically connected to an auxiliary alternating current machine 3, referred to hereinafter as a booster, which is provided with a field winding 4. The booster is preferably of the synchronous type, and as shown is connected in series with converter 1 and connected by means of the collecting rings 5 to a power transformer to be described presently. The converter 1 is connected through a commutator 6 to a direct current distribution circuit 7. The booster field winding 4 is provided with a switch 8 to enable the booster field to be interrupted when desired.

The booster field winding 4 is varied and reversed by varying and reversing the voltage applied thereto. I preferably accomplish this by means of a set of resistances 9 connected across the direct current mains 7. In practice the number of resistances in this set may be considerably greater than that shown. The set of resistances 9 is connected to two rows of contacts 10 and 11 and the terminals of the booster field 4 are connected to arms 12 and 13 which are rigidly connected together and engage the rows of contacts 10 and 11 respectively. When these arms engage the extreme left hand contacts, the full voltage of the mains is applied to the field winding 4 in one direction. By moving the arms to the adjacent contacts, a fraction of the voltage of the mains is applied to the winding 4. When the arms engage the middle contacts, no voltage is applied to the winding 4. A further movement of the arms toward the right applies a voltage to winding 4 which is in the opposite direction to that which was applied when the arms engaged contacts to the left of the middle, and when the arms engage the extreme right hand contacts, full voltage is applied in the opposite direction to that applied when the arms engage the extreme left hand contacts.

The synchronous converter is connected to an alternating current supply circuit 14 through suitable switching means 15, a regulating transformer 16, and a power transformer 17. The secondary winding of transformer 17 is connected to the collecting rings 5 of the rotary converter. The regulating transformer 16 comprises low voltage windings 18 connected in series with the primary winding of transformer 17, and high voltage windings 19 connected in star to be energized from the primary supply circuit 14. The capacity of this transformer may be chosen in accordance with the desired conditions and, for example, may be designed to lower the voltage approximately 15%. For economical purposes this transformer may be designed with a short time rating, for example, full capacity rating for one-half hour without injurious heating, but operating conditions on different systems may dictate a different design. This transformer is preferably designed with sufficient reactance to limit short-circuit currents and is built mechanically strong enough to withstand repeated short-circuits. The secondary windings 18 are provided with a short-circuiting switch 20 and the primary windings 19 are provided with a switch 21 to open or close the common connection of the star so that the winding may be deenergized or energized when desired. The switches 20 and 21 should be interlocked to prevent switch 21 from being opened when switch 20 is opened and, as shown, are interlocked by means of a rigid connecting bar 22. This permits simultaneous operation of the switches so that switch 21 is closed when switch 20 is open or vice versa.

In starting the equipment shown, the operation is as follows: Let it be assumed that the line switch 15 is in the open position, that switches 20 and 21 are in a position to the extreme left so that the secondary windings 18 of the regulating transformer are short-circuited, and the primary windings 19 are open-circuited, and that the contact arms 12 and 13 of the set of resistances 9 are in the vertical or neutral position so that field winding 4 of the booster 3 is not energized. Switch 21, and consequently, switch 20 is now moved to the right. This connects the primary windings 19 in star and open-circuits the shunt circuit around secondary windings 18. The line switch 15 is then closed and 85% normal voltage is impressed on the power transformer 17, assuming that the primary supply voltage is 100% and the regulating transformer is designed for 15% voltage reduction. The synchronous converter 1 is now energized sufficiently to start and is accelerated in the well known manner by induction motor action and brought into synchronism with the supply line.

After the converter has attained synchronism the voltage applied to the converter windings may be gradually increased to 100% normal voltage by energizing the field winding 4 for the boosting condition. For purposes of explanation, let it be assumed that the maximum boost condition is obtained when the arms 12 and 13 are moved to the extreme right and that the maximum buck condition is obtained when the arms are moved to the extreme left. It will also be assumed that the booster is designed to permit 15% increase or decrease of voltage, but it will, of course, be apparent that the capacity of the regulating transformer or operating conditions on a particular system may dictate a different design. With these assumptions the arms 12 and 13 will be moved to the right so that the voltage of the booster is gradually raised to equal the voltage decrease obtained by the regulating transformer. Under these conditions the voltage applied to the converter 1 has been gradually increased to 100% supply voltage. When this condition is obtained, the regulating transformer is cut out of the circuit by moving switches 20 and 21 to the left. Simultaneously therewith the booster field winding is deenergized by opening the switch 8, and arms 12 and 13 are then moved to the vertical or neutral position, and switch 8 is again closed.

Operating conditions may now make it desirable to reduce the direct current voltage in order to reduce the load carried by the converter. To accomplish this reduction in voltage, the arms 12 and 13 are gradually moved to the left until the maximum buck condition is reached. The voltage applied to the converter is thereby reduced to 85% of normal. If a further reduction is desired, the regulating transformer is introduced into the circuit by moving switches 20 and 21 to the right and simultaneously therewith opening the booster field switch 8. The arms 12 and 13 are then moved back to the neutral position and switch 8 is again closed. Arms 12 and 13 are again moved to the left to the maximum buck position and the voltage is thereby gradually reduced to 70% of normal. When the overload conditions have ceased, the voltage applied to the converter is gradually raised by proceeding in a manner which will be obvious from the preceding description of the sequence of operation necessary for decreasing the voltage.

It will thus be observed that by means of the comparatively inexpensive, simple, and rugged regulating transformer operated with a synchronous booster converter, means are provided both for starting the converter at reduced voltage and for effecting a voltage change in small increments without interrupting the circuit to the converter which is greater than the voltage change obtainable by the booster or regulating transformer operated singly.

While I have shown and described one embodiment of my invention, I do not desire to be limited to the exact arrangement shown and described, but seek to cover in the appended claims all the modifications that fall within the true spirit and scope of my invention.

What I claim as new and desire to secure by Letters Patent of the United States, is:—

1. In combination, an alternating current circuit, a direct current circuit, converting means, interconnecting said circuits, means interposed between said alternating current circuit and said converting means for varying in small increments the voltage applied to said converting means, a series regulating transformer interposed between said alternating current circuit and said converting means having stationary, primary and secondary windings for supplying a voltage substantially equal to the maximum voltage of said first-mentioned means, switching means for controlling the energization of said regulating transformer, and regulating means for said voltage-varying means.

2. In combination an alternating current supply circuit, a direct current distribution circuit, a rotary transformer interconnecting said circuits, means interposed between said supply circuit and said rotary transformer adapted for introducing therebetween a voltage variable in small increments, means comprising a series regulating transformer interposed between said supply circuit and said rotary transformer having stationary primary and secondary windings for effecting a voltage change substantially equal to the sum of the voltage increments in a given direction of said first-mentioned means, and switching means for controlling said first-mentioned means and said regulating transformer for effecting incremental changes in the voltage applied to said rotary transformer of a magnitude equal to the minimum increments of change effected by said first-mentioned means over the combined operating range of said first-mentioned means and said series regulating transformer.

3. In a system of distribution, an alternating current supply circuit, a direct current distribution circuit, a rotary transformer interconnecting said circuits, means comprising a dynamo-electric machine having a variable and reversible voltage operated in electrical phase synchronism and connected in series with said rotary transformer, means comprising a regulating transformer interposed between said supply circuit and said rotary transformer, said regulating transformer having stationary primary and secondary windings in shunt and series relation respectively with the circuit to said rotary transformer for introducing a voltage component in said circuit equal to the maximum voltage of said dynamo-electric machine, and means for controlling the energization of said first and second mentioned means for varying the voltage applied to said rotary transformer in voltage increments equal to the minimum increments of change effected by said dynamo-electric machine and over the combined operating range of said first and second mentioned means.

4. In combination, an alternating current supply circuit, a direct current distribution circuit, a synchronous booster converter interconnecting said circuits, a field winding for the booster of said converter, means for energizing said field winding, means for varying and reversing the excitation voltage applied to said field winding, and a regulating transformer comprising stationary windings for reducing the voltage applied to the terminals of said converter at starting by an amount equal to the maximum voltage of said synchronous booster and for cooperating with said booster for varying the voltage applied to the terminals of said converter in increments equal to the minimum increments effected by said synchronous booster without interrupting the electrical circuit to said converter over a range equal to the combined voltage variation obtainable by said booster and transformer.

5. In combination, an alternating current supply circuit, a direct current distribution circuit, a synchronous booster converter interconnecting said circuits, a field winding for the booster of said converter means for energizing said field winding, means for varying and reversing the excitation voltage applied to said field winding, a regulating transformer interposed between said supply circuit and said converter comprising primary and secondary windings, said secondary windings being connected in series with said converter, switching means for connecting said primary windings in star to said supply circuit, switching means for controlling a shunt circuit to said secondary windings, and means for interlocking said switching means to effect energization of said primary windings when the shunt circuit to said secondary windings is open-circuited and for closing the shunt circuit to said secondary windings when said primary windings are deenergized.

6. The method of varying the voltage applied to a synchronous converter provided with a series booster and a series regulating transformer having a maximum voltage limit substantially the same as said booster, which consists in changing the voltage of said booster in small increments to its maximum voltage limit, then simultaneously energizing and inserting said regulating transformer and deenergizing said booster, and then energizing said booster for minimum voltage and gradually changing the voltage of said booster in small increments to its maximum voltage limit.

7. The method of varying in small increments the voltage applied to an electrical device from a source of supply by means interposed therebetween and including a voltage varying means having a minimum incremental change greater than the value of one of said small increments and a voltage varying means having a minimum incremental change equal to the value of one of said small increments, which comprises energizing said second mentioned voltage varying means and making incremental changes until the accumulated change equals the increment of change possible with said first mentioned means, then energizing said first mentioned voltage varying means simultaneously with the deenergization of said second mentioned voltage varying means, and then adjusting said second mentioned voltage varying means to its minimum voltage varying value and energizing it and effecting incremental changes of voltage in the same direction as were made initially.

8. The method of gradually varying the voltage from a substantially constant source of supply by means of a plurality of voltage varying means effecting respectively changes of voltage in steps of substantial magnitude and changes in small steps, which comprises energization of said second mentioned means and variation of its voltage until the accumulated change effected thereby is substantially equal to the magnitude of the step possible with said first mentioned means, then energizing said first mentioned means simultaneously with the deenergization of said second mentioned means, and then adjusting said second mentioned means to its minimum voltage value and energizing it and effecting variations in voltage accumulatively with said first mentioned means.

In witness whereof, I have hereunto set my hand this 7th day of August, 1926.

THEOPHILUS F. BARTON.